Patented June 26, 1951

2,558,613

UNITED STATES PATENT OFFICE 2,558,613

MANUFACTURE OF STEEL

Jean Charles Fourmanoit, Brussels, Belgium

No Drawing. Application May 18, 1950, Serial No. 162,817. In Belgium November 5, 1941

Section 1, Public Law 690, August 8, 1946
Patent expires November 5, 1961

9 Claims. (Cl. 75—55)

This invention relates to manufacture of steel; and it comprises a method particularly applicable to the open hearth process wherein a steel furnace is charged with metallic steel-making ingredients, the charge including as substantially the sole carburizing, deoxidizing-degasifying component a carbon-impregnated lime product, followed by converting the charge in the furnace to steel; said lime product being one produced by calcining rock limestone, coarsely crushing the resulting lime, treating the lime in lump form at temperatures of the order of 250° C. with an excess of a molten bituminous material substantially uniformly to impregnate the pores of the lumps with said bituminous material, and draining off the excess bituminous material to obtain a product in lump form having the structure of the original limestone with from about 25 to 35 per cent by weight of said bituminous material substantially uniformly distributed throughout its pores in a highly dispersed state; all as more fully hereinafter set forth and as claimed.

This application is a continuation-in-part of my copending application, Serial No. 732,375, filed March 4, 1947, now abandoned. In the parent application my process is described in general terms and illustrated with a specific example while in the present application the description is amplified by the addition of two additional specific examples and by defining the invention more specifically.

In the conventional open hearth process of making steel the charge usually consists of scrap iron, pig iron and/or cast iron and slag-forming components. The pig iron and/or scrap iron in the charge serves as a carburizing and deoxidizing agent. In many cases it would be advantageous to eliminate the pig and/or cast iron from the charge but prior to the present invention no suitable carburizing and deoxidizing agent has been discovered which would be entirely suitable as a replacement.

I have discovered that if rock limestone is calcined, coarsely crushed and then treated with a molten bituminous material under conditions producing substantially uniform impregnation with bitumen of the pores of the pieces of lime down to their deepest regions, this product, which retains the original structure of the limestone and which has considerable mechanical strength, can be incorporated in a steel-making charge substantially as the sole carburizing, deoxidizing-degasifying component. A steel is obtained which is very pure and which possesses mechanical properties which are extremely advantageous.

I have found that this result cannot be produced if the lime product is impregnated only superficially or if the lime is pulverized and made into briquettes using the same amount of bituminous material as a binder. Briquettes of this type disintegrate during the heating and the bituminous material then burns without effecting any substantial carburizing effect. The same is true if the bituminous material is present merely as a coating on the lime particles. When my new impregnated lime product is employed, in contrast, the carbon is gradually and continuously released from the pores of the lime particles during the entire heat and thus produces the required carburizing, deoxidizing-degasifying effect.

I have discovered three different methods by means of which the lime particles can be satisfactorily impregnated. In the first two of these methods a differential air pressure is employed to drive the molten bituminous material into the pores. Thus the lime product is subjected to reduced pressures just before or while it is being contacted with molten bitumen. This removes the air from the pores and then when the vacuum is released or superatmospheric pressure is applied, the differential pressure thereby produced forces the bitumen into the pores. An equivalent result is produced by the use of superatmospheric pressures alone during the impregnating step, these pressures tending to force the molten bitumen into the pores. It is only necessary to establish a pressure on the molten bitumen which is higher than the pressure inside the pores of the lime particles. Surprisingly I have also found that satisfactory impregnation can be achieved by heating the lime product with an excess of molten bitumen over an open flame, for example, by heating the lime with molten bitumen in a vessel directly heated with an open flame for a period of from about 3 to 4 hours with the hot gases contacting the material under treatment.

The calcined rock limestone which is impregnated in my process should be coarsely crushed so that no particles exceed about 10 mm. and fines should be eliminated before the impregnation step. Unless a freshly calcined product is employed the lime should be thoroughly dried, by passing through a drying oven, for example, prior to the impregnating step. The bituminous materials employed may be any of the usual products which are solid at ordinary temperatures, which melt when heated and which contain hydrocarbons and uncombined carbon. Coal tar, coal pitch, petroleum pitch, wood tar and the like are examples of suitable bituminous materials.

The impregnating step of my process is conveniently conducted in an autoclave, at least when a differential pressure is relied upon to produce the desired degree of impregnation. The crushed lime product, after being subjected to a drying operation if necessary, is charged into the autoclave. In my preferred process the autoclave is then heated and evacuated to remove air from the pores of the lime. The bituminous material is heated in a separate container to a temperature of the order of 250° C. and, after the occluded gases have been removed from the lime, the liquid bituminous material is injected into the autoclave, preferably under pressure. The bituminous material evolves gases and, if the autoclave is kept closed and its temperature maintained at approximately 250° C., the pressure inside soon builds up to superatmospheric pressures. This tends to force the bituminous material into the pores of the lime. After heating for several hours the bituminous material is drained from the impregnated lime product and after cooling the latter is then ready to be used in my steel making process.

It is possible to omit the initial evacuating step of the process described in the preceding paragraph and a substantially equal degree of impregnation can be obtained if the autoclave is heated when closed for a slightly longer period. During this heating period the pressure in the autoclave may build up to 10 kilograms per square centimeter or higher depending upon the bituminous material employed. Air or other gases may be passed into the autoclave to produce a superatmospheric pressure if desired.

If an autoclave is not available I have found it possible to obtain a satisfactory impregnation of the lime merely by prolonged heating of the crushed lime at a temperature of approximately 250° C. in contact with a large excess of molten bituminous material in an open vessel heated by an open flame. The occluded gases in the pores of the lime expand under these conditions and gradually escape from the charge while the molten bitumen is simultaneously absorbed into the pores.

All of the three impregnating processes described, when conducted properly, produce inherently a lime product the pores of which are impregnated substantially uniformly and to their deepest regions with bitumen in a highly dispersed state and in quantity amounting to from about 25 to 35 per cent by weight. The particles of this product may be distilled off by heating of the impregnated product to remove volatiles. In this case the remaining bitumen is largely in the form of carbon. The final impregnated product is highly stable. It is substantially impervious to moisture and it does not slake or disintegrate under ordinary conditions. It can be shipped to the steel making plant if desired or stored over reasonable periods before use. This stability of the product is a highly important advantage.

While, as I have stated, my steel making process making use of my new carburizing, deoxidizing-degasifying is adapted particularly to the open hearth process it can also be conducted in the electric furnace process. In both cases my impregnated lime can be substituted for all or part of the pig and/or cast iron conventionally used in these processes. It can also be added to the ladle or even to the mold or wherever a carburizing or deoxidizing action is required in the steel making process.

The following specific examples represent practical operating embodiments of my process wherein steel is made from scrap iron utilizing my new bitumen-impregnated lime product as the sole carburizing, deoxidizing-degasifying substance in the charge.

*Example 1*

1000 kilos of rock limestone are calcined in such a manner as to obtain a homogeneous product. As soon after the calcination as possible, the product is crushed, sized, dried if necessary and subjected inside an autoclave to a vacuum of about 70 cm. of Hg. during one hour in such a manner as to extract all the occluded gases. 2000 kilos of pitch heated to a temperature of about 250° C. are afterwards injected into the autoclave in which the vacuum has been made. A pressure of 8 kilos per cm.$^2$ is established for about 2 hours, by maintaining the temperature at 250° C. or a temperature near the latter. The excess of pitch is allowed to drain off. In this manner a product containing about 35 per cent by weight of pitch is obtained.

A product is obtained inside the autoclave which contains the carbon distributed in the mass of the limestone in a state of division which may be compared to colloidal suspension. The said product is used in the manufacture of steel for the introduction of the non-combined carbon corresponding to the graphitic or combined carbon of the usual cast-iron and of the deoxidizing and degasifying substance.

As an example, the following may be given:

A charge comprising 50 tons of scrap iron and 2750 kilos of limestone treated as above is charged into an open-hearth furnace. The process of steel manufacture is carried out as usual for an open-hearth operation. A steel is obtained which is very pure and possesses mechanical characteristics which are extremely advantageous. In one operation a steel having the following analysis was obtained:

| | Percent |
|---|---|
| Carbon | 0.03 |
| Silicon | trace |
| Sulphur | 0.010 |
| Phosphorus | 0.005 |
| Manganese | 0.14 |
| Nickel | 0.05 |
| Chromium | 0.35 |
| Molybdenum | 0.01 |
| Copper | 0.01 |
| Tin | 0.01 |
| Nitrogen | 0.004 |

The tensile properties were:

| | | |
|---|---|---|
| Yield point | tons/sq. in. | 16.0 |
| Maximum stress | | 24.5 |
| Elongation | percent | 48.0 |
| Reduction of area | do | 84.0 |
| Izod | ft. lbs. | 81 and 82 |

The same treatment may of course be carried out in another metallurgical furnace, for instance an electric furnace.

*Example 2*

Limestone in rock form is calcined so as to make a homogeneous product. The lime obtained is crushed and sized to obtain pieces of uniform size. 1000 kilos of the sized product are introduced into an autoclave and, after heating, about 2000 kilos of petroleum pitch, preheated to a temperature of about 250° C. are introduced. Heating is continued for a period of from 3 to 4 hours at a temperature of 250° C. during which period the pressure rises to 12 kg./cm.$^2$ and the pores of the lime pieces are thereby impregnated down to their deepest regions. According to the porosity of the calcined limestone the final product obtained in this manner always contains from about 25 to 35 per cent by weight of pitch. In addition to scrap iron the lime product obtained as described is introduced as part of a steel-making charge into an electric furnace in lieu of the pig iron conventionally used in the charge, as a carburizing, deoxidizing-degasifying agent. The heat is conducted as usual and a finished steel is obtained which is exceptionally high grade.

*Example 3*

Limestone in rock form is calcined to obtain a uniform product. The product is broken into pieces, sized and the fines eliminated. 1000 kilos of this product are placed in a basket of wire netting. 2000 kilos of pitch are placed in a pot of cast-steel and heated above a naked fire surrounded with masonry with a circulation of combustion gases around the pot so as to obtain uniform heating. When the pitch reaches a temperature of about 250° C. the metal basket with its contents is plunged into the pot and the heating is continued for a period of from 3 to 4 hours. The product is then removed from the pot and the excess pitch drained off. Products produced in this manner also contain from about 25 to 35 per cent of pitch by weight depending upon the quality of the limestone and its degree of calcination. This product is used in a steel making process in the same manner as the similar product was used in Example 1.

While I have described what I consider to be the most advantageous embodiments of my process it is obvious, of course, that various modifications can be made in the specific procedures which have been described without departing from the purview of this invention. Thus while I have described impregnation of the lime product at a temperature of about 250° C. it is possible, of course, to obtain substantially the same results over a temperature range extending about 50° to either side of 250° C. The lower temperatures require a somewhat longer period of treatment and are used advantageously with bituminous materials having relatively low melting points. Pitches melting with difficulty may be heated to temperatures somewhat above 250° C. during the impregnating step. In steel making processes making use of my impregnated lime product it may not be necessary to add the conventional slag-forming ingredients since my lime product usually performs all of the functions of the usual slag as well as of the pig or cast iron of the usual charge. Further modifications of my invention which fall within the scope of the following claims will be evident to those skilled in this art.

The impregnation, for certain qualities of bitumen (pitch of high melting point, etc.) may be carried out over a temperature range of from about 250° C. to a temperature 250° C. above the melting point of the bitumen.

What I claim is:

1. In the process of making steel, the improvement which comprises charging a steel furnace with metallic steel-making ingredients and including in said charge substantially as the sole carburizing, deoxidizing-degasifying component a carbon-impregnated lime product produced by calcining limestone, crushing the resulting lime, treating the resulting lime product in lump form with an excess of liquid bituminous material at temperatures of the order of 250° C. substantially uniformly to impregnate the pores of the lumps with said bituminous material; said bituminous material being solid at ordinary temperatures and containing hydrocarbons and uncombined carbon; and draining off the excess bituminous material to obtain a product in lump form having the structure of the original limestone with from about 25 to 35 per cent by weight of said bituminous material substantially uniformly distributed throughout its pores in a highly dispersed state; and converting the resulting charge in the furnace to produce a carburized steel.

2. The process of claim 1 wherein the said lime product is subjected to a vacuum to remove air from its pores prior to completion of the impregnating step.

3. The process of claim 1 wherein the said lime product is subjected to a vacuum to remove air from its pores and then to superatmospheric pressures to drive said bituminous material into its pores prior to completion of the impregnating step.

4. The process of claim 1 wherein the said lime product is subjected to superatmospheric pressures to drive said molten bituminous material into its pores prior to completion of the impregnating step.

5. The process of claim 1 wherein the said lime product is impregnated by heating it over an open flame with an excess of said bituminous material for a period of from about 3 to 5 hours.

6. In the manufacture of steel, the improvement which comprises charging a steel furnace with metallic steel-making ingredients and including in said charge substantially as the sole carburizing, deoxidizing-degasifying component an impregnated lime product prepared by calcining rock limestone, crushing the resulting lime, promptly applying a high vacuum to the calcined limestone while in lump form to remove occluded gases from its pores, treating the lumps with an excess of a liquid bituminous material at elevated temperatures substantially uniformly to impregnate the pores with bituminous material, said bituminous material being solid at ordinary temperatures and containing hydrocarbons and uncombined carbon, and draining off the excess bituminous material to obtain a product in lump form having the structure of the original limestone with said bituminous material substantially uniformly distributed throughout its pores in a highly dispersed state; and converting the resulting charge in said furnace to produce a carburized steel.

7. The process of claim 6 wherein superatmospheric pressure is applied to the mixture of calcined limestone and bituminous material in said retort to increase the penetration of the bituminous material into the pores of the calcined limestone.

8. The process of claim 6 wherein the bituminous material is pitch and the impregnating temperature is of the order of 250° C.

9. In the process of making steel, the improvement which comprises charging a steel furnace with metallic steel-making ingredients and including in said charge substantially as the sole carburizing, deoxidizing-degasifying component a carbon-impregnated lime product produced by calcining limestone, crushing the resulting lime, treating the resulting lime product in lump form with an excess of liquid bitumen at temperatures over a range of from about 250° C. to a temperature 250° C. above the melting point of the bitumen substantially uniformly to impregnate the pores of the lumps with said bitumen; said bitumen being solid at ordinary temperatures and containing hydrocarbons and uncombined carbon; and draining off the excess bitumen to obtain a product in lump form having the structure of the original limestone with from about 25 to 35 per cent by weight of said bitumen substantially uniformly distributed throughout its pores in a highly dispersed state; and converting the resulting charge in the furnace to produce a carburized steel.

JEAN CHARLES FOURMANOIT.

REFERENCES CITED

The following references are of record in the file of this patent:

UNITED STATES PATENTS

| Number | Name | Date |
|---|---|---|
| 1,383,749 | Osborne | July 5, 1921 |
| 2,083,863 | Pfeiffer | June 15, 1937 |
| 2,334,499 | Millard | Nov. 16, 1943 |